Sept. 25, 1934.  W. LEHMAN  1,974,426
DRAG BUCKET HOOK
Filed June 9, 1932   2 Sheets-Sheet 1
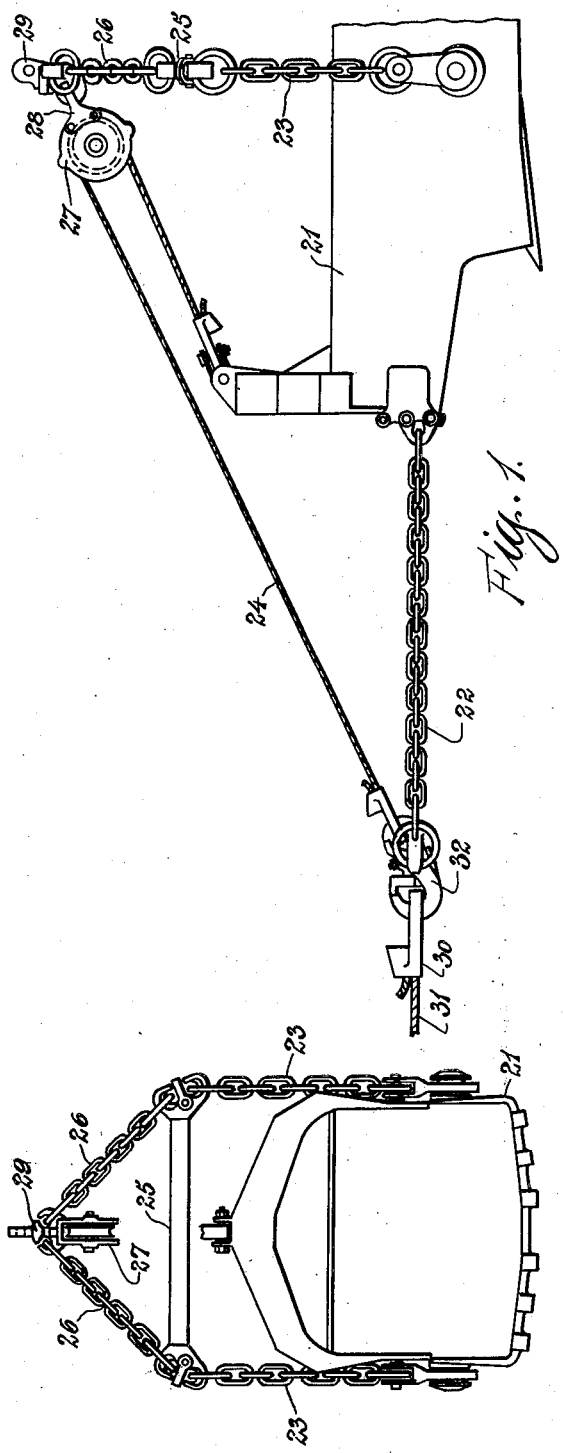
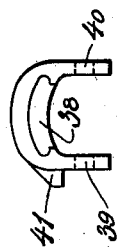
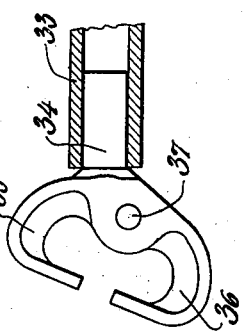
Werner Lehman,
INVENTOR.
BY Hoar, Ruhloff & Arnaud
ATTORNEYS.

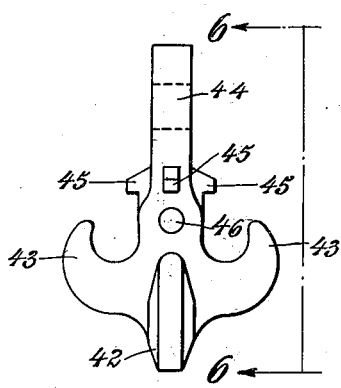
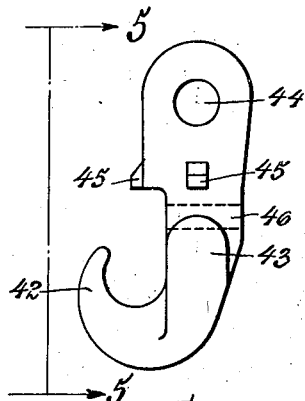
Fig. 5.   Fig. 6.
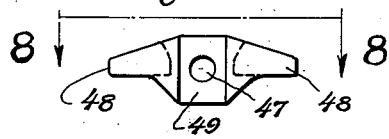
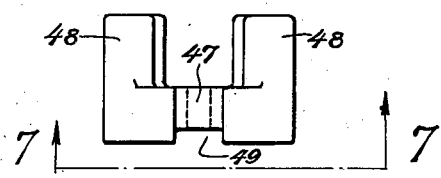
Fig. 7.   Fig. 8.
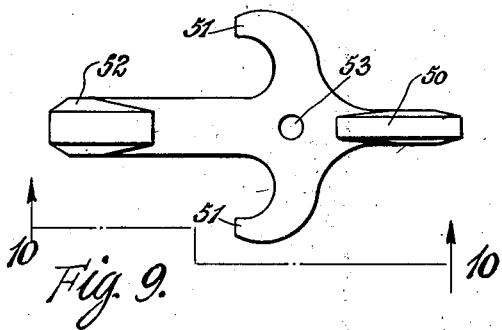
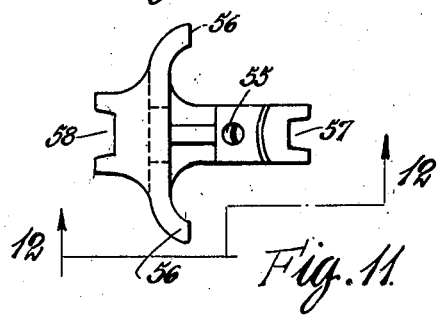
Fig. 9.   Fig. 11.
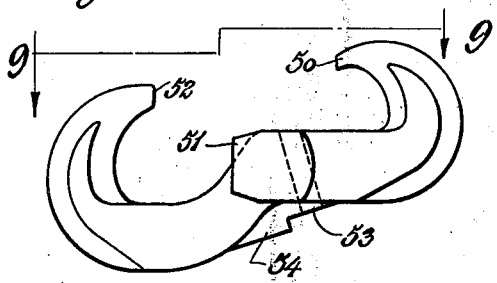
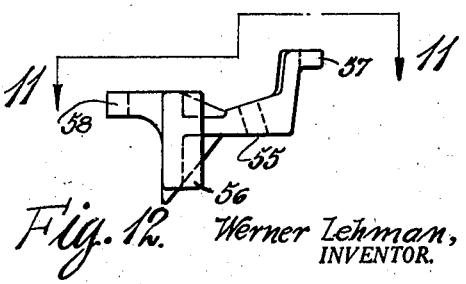
Fig. 10.   Fig. 12.

Patented Sept. 25, 1934

1,974,426

UNITED STATES PATENT OFFICE 1,974,426

DRAG BUCKET HOOK

Werner Lehman, South Milwaukee, Wis., assignor to Bucyrus-Erie Company, South Milwaukee, Wis., a corporation of Delaware Application June 9, 1932, Serial No. 616,209

7 Claims. (Cl. 37—135)

My invention relates to new and useful improvements in hooks for attaching together the various ropes and chains which manipulate the drag bucket of a dragline excavator.

Such buckets are well known in the art. In such buckets there are two places where two chains (or ropes) come together, and two places where four chains (or ropes) come together. The securing together of such chains (or ropes) at these points has always afforded a problem of flexibility, a problem of preventing entanglement of the chains and ropes, and a problem of quick detachability, none of which has ever before been adequately solved in the art.

Accordingly it is the principal object of the present invention to provide, for this purpose, means which will satisfactorily solve the three above-mentioned problems.

In the case of the spacer for the hoist chains, there has existed the still further problem of combining strength and lightness with a construction which will solve the three above-mentioned problems. Accordingly this becomes a further object of my invention.

In addition to my principal objects, I have worked out a number of novel and useful details, which will be readily evident as the description progresses.

My invention consists in the novel parts, and in the combinations and arrangements thereof, which are defined in the appended claims; and of which one embodiment is exemplified in the accompanying drawings, which are hereinafter particularly described and explained.

Throughout the description, the same reference number is applied to the same member or to similar members.

Figure 1 is a side elevation of a drag bucket, and its associated chains and ropes, embodying three exemplifications of my invention.

Figure 2 is a front elevation of the same bucket, with the dump rope and drag chains omitted, and part of the attachment of the dump rope to the arch of the bucket cut away.

Figure 3 is a front elevation of one end of my spacer, partly in section.

Figure 4 is a plan view of one of the guards for this spacer.

Figure 5 is a front elevation of my triple hook, taken along the lines 5—5 of Figure 6.

Figure 6 is a side elevation of this hook, taken along the lines 6—6 of Figure 5.

Figure 7 is a front elevation of the guard for this hook, taken along the lines 7—7 of Figure 8. This guard is here shown as occupying the position that it would occupy if superimposed on the hook as shown in Figure 5.

Figure 8 is a plan view of this guard, taken along the lines 8—8 of Figure 7.

Figure 9 is a plan view of my quadruple hook, taken along the lines 9—9 of Figure 10.

Figure 10 is a side elevation of this hook, taken along the lines 10—10 of Figure 9.

Figure 11 is a plan view of the guard for this hook, taken along the lines 11—11 of Figure 12. This guard is here shown as occupying the position which it would occupy if superimposed on the hook as shown in Figure 9.

Figure 12 is a side elevation of this guard, taken along the lines 12—12 of Figure 11. This guard is here shown as occupying the position which is would occupy if superimposed on the hook as shown in Figure 10.

Referring to the drawings, more particularly Figures 1 and 2, it will be seen that 21 is a drag bucket having two drag chains 22 (one behind the other in Figure 1, so only one is shown), two hoist chains 23, and a dump rope 24.

The hoist chains 23 are held apart by a spacer 25, for the details of which see the discussion of Figures 3 and 4. From the spacer 25, two chains 26 proceed convergently upward.

The dump rope 24 is reeved through a sheave-block 27, having a removable ring 28. This ring and the two chains 26 are secured together by triple hook 29, to which the hoist rope (not shown) is also secured. For the details of this triple hook see the discussion of Figures 5 to 8.

The dump rope 24, the two drag chains 22, and the rope socket 30 of the drag rope 31 are secured together by the quadruple hook 32, for the details of which see the discussion of Figures 9 to 12.

It is to be understood that the triple hook 29 and the quadruple hook 32 can be interchangeably used, by the cooperating use of appropriate rope sockets on the hoist and drag ropes.

Referring now to Figure 3, which represents one end of the spacer 25 of Figures 1 and 2, we see that 33 is a piece of pipe, in which there is inserted and properly secured (as by welding) a head 34. This head has a hooked portion 35 to engage the chain 26, a hooked portion 36 to engage the chain 23, and a bolt hole 37.

Referring now to Figure 4, which is a plan view of the guard for the double hook of Figure 3. The web 38 fits between the points of the hooked portions 35 and 36, and a bolt passing through holes 39, 37 and 40, secures the guard in place. A boss 41 is provided, to keep the bolt head from turning.

Referring now to Figures 5 and 6, which represent the triple hook 29 of Figures 1 and 2, we see that 42 is a hooked portion to hold the ring 28 of the sheave block 27. 43 are hooked portions to hold the chains 26. 44 is a hole to receive the rope socket (not shown) of the hoist rope (not shown). 45 are bosses to keep the guard from rotating when in place. 46 is a bolt hole.

The cooperating guard is shown in Figures 7 and 8. A bolt (not shown), passing through hole 47 of the guard and hole 46 of the triple hook, secures the two together. Then projections 48 fit across the points of hooked portions 43, thus closing those hooked portions; and the point of hooked portion 42 fits into recess 49, thus closing that hooked portion. This recess 49 also serves to receive the bolt head, and thus keep it from turning.

Referring now to Figures 9 and 10, which represent the quadruple hook 32 of Figure 1, we see that 50 is a hooked portion to receive the rope socket of the dump rope 24. 51 are hooked portions to receive the drag chains 22. 52 is a hooked portion to receive the rope socket 30 of the drag rope 31. 53 is a bolt hole. 54 is a projection to keep the bolt head from turning.

The cooperating guard is shown in Figures 11 and 12. A bolt (not shown), passing through hole 55 of the guard and hole 53 of the quadruple hook, secures the two together. Then projections 56 fit across the points of hooked portions 51, thus closing those hooked portions; and the point of hooked portion 50 fits into recess 57, thus closing that hooked portion; and the point of hooked portion 52 fits into recess 58, thus closing that hooked portion.

Having now described and illustrated three forms of my invention, I wish it to be understood that my invention is not to be limited to the specific forms or arrangements of parts hereinbefore described, except in so far as such limitations are specified in the appended claims.

I claim:

1. A multiple hook for a drag bucket, comprising: a length of pipe; and two heads, each head having two hooked portions and provision for attaching to each head a guard for closing the two hooked portions.

2. A multiple hook for a drag bucket, having: two hooked portions; provision for attaching a guard for closing the two hooked portions; and a pipe-receiving projection.

3. An attaching means for the tension members of a drag bucket, comprising: a length of pipe; two heads, each head having means for attachment to the pipe, and two hooked portions; two guards, each to close the two hooked portions of one corresponding head; and means to removably secure each guard to its respective head.

4. A multiple hook for a drag bucket, comprising: a spacer bar; and two heads, each head having two hooked portions and provision for attaching to each head a guard for closing the two hooked portions.

5. A multiple hook for a drag bucket, having: two hooked portions; provision for attaching a guard for closing the two hooked portions; and a portion adapted for attachment to a spacer bar.

6. An attaching means for the hoist chain of a drag bucket, comprising: a spacer bar; two heads, each head having two hooked portions and provision for attachment to the spacer bar; two guards, each to close the two hooked portions of one corresponding head; and means to removably secure each guard to its respective head.

7. A guard for a double hook for a drag bucket, comprising: two legs to span the sides of the double hook, each leg having a hole for the inserting of a bolt to secure the guard to the hook; means on one hook, to keep the bolt from rotating; an arch joining the legs and having recesses for the reception of the respective points of the hook; and a web to close the space between the two parts of the hook.

WERNER LEHMAN.